United States Patent
Murakami

(10) Patent No.: US 8,619,929 B2
(45) Date of Patent: *Dec. 31, 2013

(54) POSITIONING SIGNAL RECEPTION DEVICE AND CONTROL METHOD OF POSITIONING SIGNAL RECEPTION DEVICE

(75) Inventor: Makoto Murakami, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 571 days.

This patent is subject to a terminal disclaimer.

(21) Appl. No.: 12/574,221

(22) Filed: Oct. 6, 2009

(65) Prior Publication Data

US 2010/0027591 A1 Feb. 4, 2010

Related U.S. Application Data

(63) Continuation of application No. 11/295,513, filed on Dec. 7, 2005, now Pat. No. 7,620,132.

(30) Foreign Application Priority Data

Dec. 9, 2004 (JP) ................................ 2004-356421

(51) Int. Cl.
 *H04B 1/10* (2006.01)
(52) U.S. Cl.
 USPC .......................................... 375/350; 375/149
(58) Field of Classification Search
 USPC ................................................. 375/350, 149
 See application file for complete search history.

(56) References Cited

U.S. PATENT DOCUMENTS

| 5,268,927 | A | 12/1993 | Dimos et al. |
| 5,955,987 | A | 9/1999 | Murphy et al. |
| 6,671,002 | B1 * | 12/2003 | Konishi et al. ................ 348/725 |
| 6,744,830 | B1 * | 6/2004 | Furukawa et al. ............ 375/345 |
| 6,889,175 | B2 | 5/2005 | Green |
| 2001/0016479 | A1 | 8/2001 | Wood, Jr. |
| 2002/0012411 | A1 | 1/2002 | Heinzl et al. |
| 2002/0102992 | A1 * | 8/2002 | Koorapaty et al. ........... 455/456 |
| 2003/0187576 | A1 * | 10/2003 | Sanmiya et al. .............. 701/213 |
| 2003/0198283 | A1 | 10/2003 | Patel et al. |
| 2004/0138859 | A1 * | 7/2004 | Green .......................... 702/190 |

FOREIGN PATENT DOCUMENTS

| JP | 5-157826 A | 6/1993 |
| JP | 2001-4736 A | 1/2001 |
| JP | 2003-152572 A | 5/2003 |
| JP | 2004-264242 A | 9/2004 |

* cited by examiner

*Primary Examiner* — Shuwang Liu
*Assistant Examiner* — Nader Bolourchi
(74) *Attorney, Agent, or Firm* — Global IP Counselors, LLP

(57) ABSTRACT

A positioning signal reception device receives a positioning signal transmitted from a position information satellite, and includes: a signal reception portion that obtains a reception signal by receiving the positioning signal; an A/D conversion portion that generates a digital signal by converting the reception signal into a digital form; a filter portion that subjects the digital signal to frequency separation, a characteristic of the filter portion being changeable; a filter characteristic change portion that changes the characteristic of the filter portion according to an operating state of the positioning signal reception device and an external environmental condition of the positioning signal reception device; and a code synchronization establishment portion that establishes synchronization of spreading codes contained in the reception signal.

11 Claims, 7 Drawing Sheets

POSITIONING SIGNAL RECEPTION DEVICE AND CONTROL METHOD OF POSITIONING SIGNAL RECEPTION DEVICE

CROSS-REFERENCE TO THE RELATED APPLICATIONS

This is a continuation application of U.S. patent application Ser. No. 11/295,513 filed Dec. 7, 2005, now pending, which claims priority to Japanese Patent Application No. 2004-356421 filed on Dec. 9, 2004. The entire disclosure of U.S. patent application Ser. No. 11/295,513 and Japanese Patent Application No. 2004-356421 is hereby incorporated by reference.

BACKGROUND

1. Technical Field

The present invention relates to a positioning signal reception device and a control method of the positioning signal reception device.

2. Related Art

A GPS (Global Positioning System) device has been used as a positioning system that determines a position using an artificial satellite.

A positioning signal transmitted from a GPS satellite is a radio frequency signal modulated by the CDMA (Code Division Multiple Access) scheme. After it is received by a receiver, it is demodulated and decoded by processes, such as frequency conversion, A/D conversion, frequency separation by a filter, and synchronization of PN (Pseudo Noise) codes, so that a navigation message is obtained.

Various proposals have been made for the characteristic of the filter that performs frequency separation, because it has influences on the performance as the receiver, for example, a time needed for synchronization of PN codes and the positioning accuracy.

JP-A-5-157826 (see FIG. 9) discloses a configuration to shorten the synchronization time before the synchronization of PN codes is established by broadening the bandwidth of the filter, and to enhance the stability of synchronization after the synchronization is established by narrowing the bandwidth.

Recently, the GPS receiver is incorporated into a general-purpose small terminal, such as a cellular phone, as one of its functions. Positioning is therefore performed in a place where the radio wave reception environment is poor, such as an indoor place, more often than in a case where it is incorporated into a traditional, single-purpose positioning machine. In addition, the GPS receiver is exposed to adverse effects from the other components forming the terminal that incorporates the GPS receiver, for example, noises from the CPU (Central Processing Unit) as the source of release, interference by radio waves transmitted from a cellular phone unit, etc. more frequently than before.

The configuration in the related art, however, is not able to set an appropriate filter characteristic in response to the external environment of the GPS receiver as described above, because the characteristic of the filter is changed in response to the operating state of the GPS receiver alone. This raises a problem that the positioning takes a longer time or the positioning accuracy becomes poor depending on the external environment.

SUMMARY

An advantage of some aspects of the invention is to provide a positioning signal reception device capable of performing highly accurate positioning in a short time by setting an appropriate filter characteristic in response to the external environment and a control method of the positioning signal reception device.

A first aspect of the invention provides a positioning signal reception device that receives a positioning signal transmitted from a position information satellite. The positioning signal reception device includes: a signal reception portion that obtains a reception signal by receiving the positioning signal; an A/D conversion portion that generates a digital signal by converting the reception signal into a digital form; a filter portion that subjects the digital signal to frequency separation, a phase characteristic and a frequency characteristic of the filter portion being changeable; a filter characteristic change portion that changes the characteristic of the filter portion according to an operating state of the positioning signal reception device or an external environmental condition of the positioning signal reception device; and a code synchronization establishment portion that establishes synchronization of spreading codes contained in the reception signal.

According to the first aspect of the invention, the positioning signal reception device has the signal reception portion, and is therefore able to obtain a reception signal by receiving a positioning signal transmitted from a position information satellite, for example, a GPS satellite. The reception signal is normally a radio frequency analog signal, and contains many noises besides the transmission signals. Also, the reception signal is a signal modulated by the spread spectrum-frequency hopping scheme, for example, the CDMA scheme, so that the reception signal can transmit signals from more than one position information satellite on a carrier wave at the same frequency.

The reception signal is subjected to sampling and quantization to be converted to a digital signal in the A/D conversion portion.

The digitalized reception signal is subjected to frequency separation in the filter portion, and as many signal components as possible are removed except for a desired positioning signal. The frequency characteristic as one of the characteristics of the filter portion, more specifically, a characteristic as to, of the input signals, in which frequency band a signal is allowed to pass and in which frequency band a signal is removed, can be changed by the filter characteristic change portion.

The reception signal, from which unwanted signal components have been removed by the filter portion, is sent to the code synchronization establishment portion to isolate a transmission signal from a particular position information satellite by synchronizing the spreading codes. For example, in a case where the CDMA scheme is used for transmission, the code synchronization establishment portion establishes the code synchronization by calculating the correlation from multiplication of the spreading codes generated inside the reception device and the reception signal.

A preferable characteristic for the filter portion depends on cases. This is because the preferable characteristic differs with the operating state of the positioning signal reception device, the external environmental condition of the positioning signal reception device, etc. For example, when the characteristic of the filter portion has been set on the assumption that the reception environment is satisfactory and the intensity of the reception signal is strong, the positioning may fail in an environment where the intensity of the reception signal is not sufficiently strong, such as an indoor place, because the positioning may take a long time, and in an extreme case, sufficient navigation data may not be acquired.

The positioning signal reception device of the invention, however, is configured to be able to change the characteristic of the filter portion. In addition, because the positioning signal reception device also has the filter characteristic change portion, it is possible to set the characteristic of the filter portion to best suit the operating state or the external environment of the positioning signal reception device.

The positioning signal reception device of the invention is thus able to perform highly accurate positioning in a short time.

It is preferable that the filter characteristic change portion changes the characteristic of the filter portion so that a bandwidth of a signal outputted from the filter portion becomes narrower during the time period from when the signal reception portion obtains the reception signal until the synchronization of the spreading codes is established and the synchronization comes to be maintained in a stable manner, and changes the characteristic of the filter portion so that the bandwidth of the signal outputted from the filter portion becomes broader after the synchronization of the spreading codes is established and the synchronization is maintained in a stable manner.

When configured in this manner, the filter characteristic change portion changes the characteristic of the filter portion on the basis of judgment as to the operating state of the positioning signal reception device, that is, whether the synchronization of the spreading codes is maintained in a stable manner. More specifically, the characteristic of the filter portion is changed to a narrow band before the code synchronization is stabilized, and the characteristic of the filter portion is changed to a broad band after the code synchronization is stabilized.

It is thus possible to reduce the noise components contained in the reception signal before the code synchronization is stabilized, which can in turn enhance the sensitivity of the positioning signal reception device. Also, after the code synchronization is stabilized, the phase characteristic of the reception signal is flattened over a broad frequency band, which can in turn enhance the positioning accuracy.

It is preferable that the filter characteristic change portion assumes the external environmental condition of the positioning signal reception device on the basis of signal intensity of the reception signal, and changes the characteristic of the filter portion according to the assumed environmental condition.

When configured in this manner, the filter characteristic change portion changes the characteristic of the filter portion according to the environmental condition, which is assumed on the basis of the signal intensity of the reception signal.

For the positioning signal reception device, it is difficult to directly know the environment under which the positioning signal reception device is present, for example, whether the current position is in an outdoor place with a good view in the environment under which the positioning signal is received satisfactorily, or the current position is in an indoor place in the environment under which the reception signal is not readily received. Hence, for example, an additional configuration, such as portion that checks the rough positioning result against the map database, is necessary.

However, it is possible to roughly assume that the positioning signal reception device is in an outdoor place under the environmental condition that makes it easy for waves to arrive when the intensity of the reception signal is strong, and that the positioning signal reception device is in an indoor place under the environmental condition that makes it difficult for radio waves to arrive when the intensity of the reception signal is weak. The positioning signal reception device of the invention changes the characteristic of the filter portion by utilizing these assumptions. It is thus possible to set an appropriate filter characteristic in response to the environmental condition without having to add a special configuration.

It is preferable that the filter characteristic change portion changes the characteristic of the filter portion so that a bandwidth of a signal outputted from the filter portion becomes narrower when the signal intensity of the reception signal is weak, and changes the characteristic of the filter portion so that the bandwidth of the signal outputted from the filter portion becomes broader when the signal intensity of the reception signal is strong.

When configured in this manner, the filter characteristic change portion changes the characteristic of the filter portion to a narrow band when the signal intensity of the reception signal is weak, and changes the characteristic of the filter portion to a broad band when the signal intensity is strong.

It is thus possible to enhance the sensitivity when the signal intensity of the reception signal is weak, that is, when it is assumed that the external environment is poor, and to enhance the positioning accuracy when the signal intensity of the reception signal is strong, that is, when it is assumed that the external environment is satisfactory.

It is preferable that the filter characteristic change portion changes the characteristic of the filter portion to remove a disturbing signal coming from an external of the reception device.

When configured in this manner, the filter characteristic change portion changes the characteristic of the filter portion to remove a disturbing signal.

The absence or presence of a disturbing signal from the external of the positioning signal reception device is one factor of the environmental condition. Examples of the disturbing signal include a signal transmitted for a purpose other than positioning for communications over cellular phones, noises induced from another device incorporated into a casing together with the positioning signal reception device, etc.

In a case where the occurrence of such a disturbing signal is anticipated, or where a disturbing signal is actually detected, the positioning signal reception device of the invention is able to remove the disturbing signal contained in the reception signal by changing the characteristic of the filter portion. It is thus possible to perform highly accurate positioning in a short time.

It is preferable that the filter characteristic change portion changes the characteristic of the filter portion to lower an output level of a signal outputted from the filter portion at an occurrence of the disturbing signal.

When configured in this manner, the filter characteristic change portion changes the characteristic of the filter portion to lower the output level of the signal at the occurrence of a disturbing signal. The output level of the signal is one of the characteristics of the filter portion.

It is thus possible to relieve the adverse effects on the positioning from burst noises, such as switching noises and a burst transmission of a cellular phone, that are induced irregularly for a short time.

It is preferable that the filter portion is formed of a digital filter, the digital filter has a register that stores a numerical value used to determine a characteristic of the digital filter, and the filter characteristic change portion changes the characteristic of the digital filter during operation of the positioning signal reception device by changing the numerical value stored in the register using software.

When configured in this manner, because the filter portion is formed of a digital filter having a register that stores a numerical value used to determine its characteristic, the filter characteristic change portion changes the characteristic of the digital filter by changing the numerical value stored in the register of the digital filter using software. The filter characteristic change portion can change the characteristic of the filter portion during operation of the positioning signal reception device.

Because the filter portion of the positioning signal reception device of the invention is formed of a digital filter, it is easy to achieve the filter characteristic change portion that changes the numerical value used to determine the characteristic of the filter portion stored in the register in the form of software.

The characteristic, such as the one to broaden/narrow a pass band of the digital filter or to remove a specific frequency in response to the use state of the positioning signal reception device, can be therefore changed flexibly. In addition, because the digital filter can change the characteristic faster than an analog filter, the filter characteristic change portion is able to follow an abrupt change in the external environment at a high speed.

A second aspect of the invention provides a method of controlling a positioning signal reception device that receives a positioning signal transmitted from a position information satellite. The control method includes: obtaining a reception signal by receiving the positioning signal in a reception signal reception portion; generating a digital signal by converting the reception signal in a digital form in an A/D conversion portion; subjecting the digital signal to frequency separation in a filter portion having a changeable characteristic; changing the characteristic of the filter portion according to one of an operating state of the positioning signal reception device and an external environmental condition of the positioning signal reception device in a filter characteristic change portion; and establishing synchronization of spreading codes contained in the reception signal in a code synchronization establishment portion.

As with the first aspect, the control method of the positioning signal reception device according to the second aspect of the invention enables highly accurate positioning to be performed in a short time.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, preferred embodiments of the invention will be described in detail with reference to the accompanying drawings.

Because the following embodiments are preferred examples of the invention, they have various technically preferable limitations. It should be appreciated, however, that the scope of the invention is not limited to these embodiments unless specified so in the descriptions below.

First Embodiment

Figure 1:
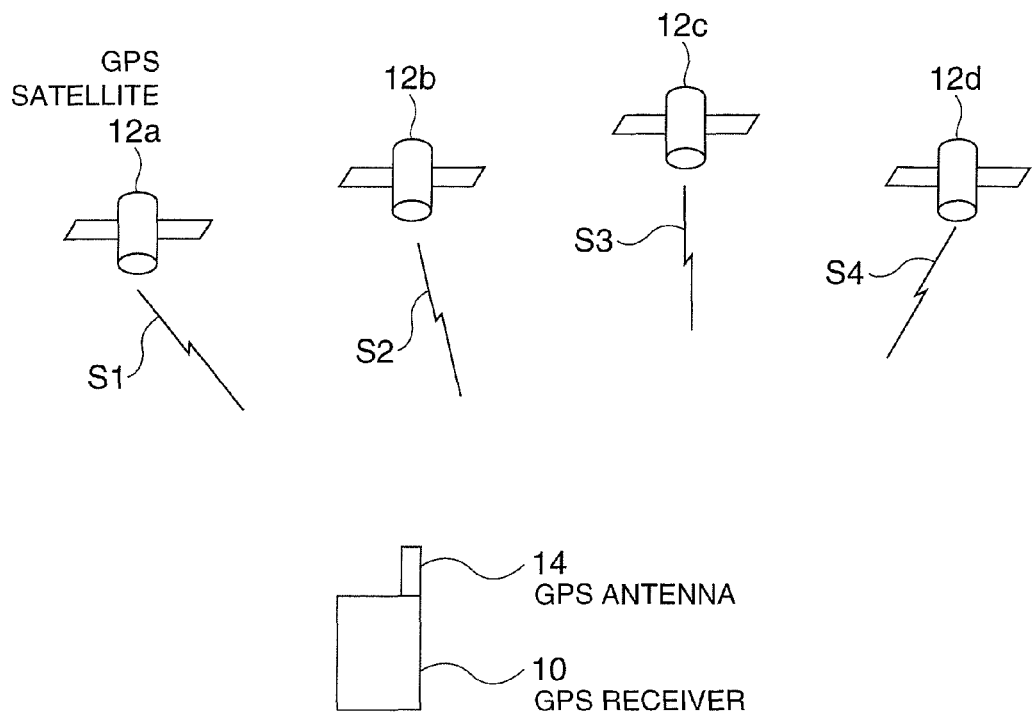
FIG. 1 is a view schematically showing a GPS receiver and the like according to one embodiment of the invention.

FIG. 1 is a view schematically showing a GPS receiver 10 and the like according to one embodiment of the invention.

The GPS receiver 10 as one example of the positioning signal reception device has a GPS antenna 14 as one example of a signal reception portion. The GPS receiver 10 performs positioning by receiving positioning signals S1 through S4 transmitted, respectively, from GPS satellites 12a through 12d as one example of position information satellites. The positioning signals S1 through S4 are radio frequency analog signals at a carrier frequency of 1.575 GHz. Also, these signals are transmitted by the CDMA scheme.

The number of the GPS satellites the GPS receiver 10 used for the positioning is not limited to four as shown in FIG. 1, and it can be three or less or five or more.

Configuration of GPS Receiver 10

Figure 2:
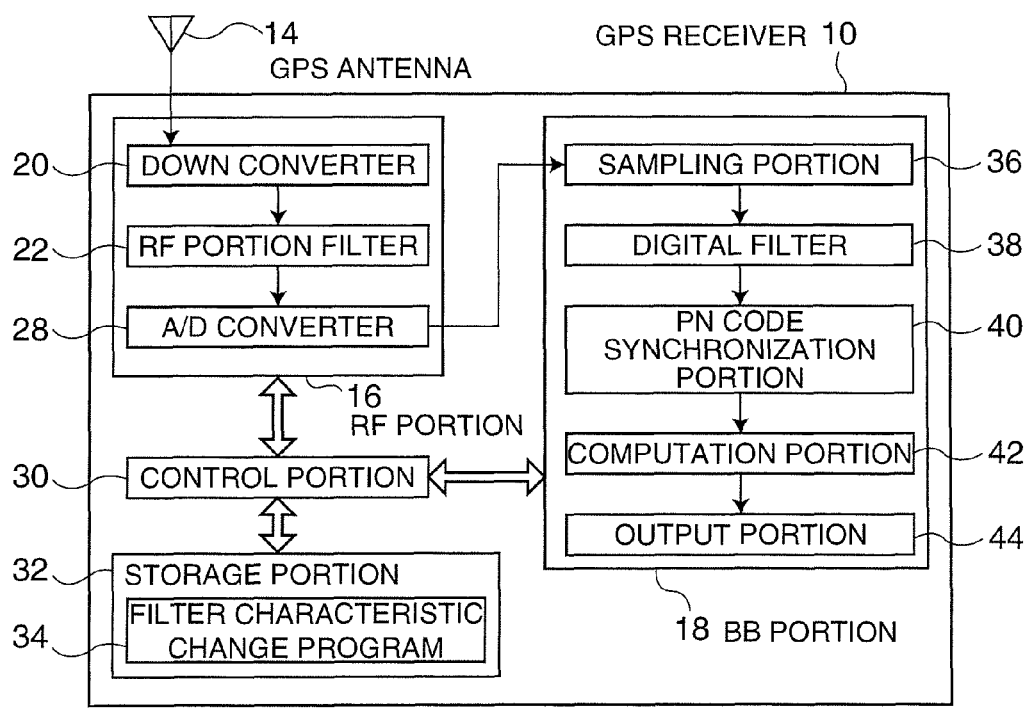
FIG. 2 is a view schematically showing the major configuration of the GPS receiver of FIG. 1.

FIG. 2 is a view schematically showing the configuration of the GPS receiver 10. Referring to the drawing, a solid line arrow indicates the flow of the processing on the reception signal, and a thick outline arrow indicates the flow of the control.

The positioning signals S1 and so forth received at the GPS antenna 14 are sent to an RF (Radio Frequency) portion 16. The reception signal sent to the RF portion 16 is processed to the form suitable for the processing performed in a BB (Base Band) portion 18. The BB portion 18 demodulates and decodes the signal, and a navigation message is consequently obtained from the reception signal.

A down converter 20 down-converts the reception signal at the frequency of 1.575 GHz to the frequency of the order of several hundred KHz, for example. This is because it is difficult to perform subsequent processing when the signal stays at a radio frequency. When down-conversion takes place, another peak of an unwanted signal is generated at a symmetric position with respect to the frequency of the reception signal in addition to an aimed output frequency. Such an unwanted signal is removed by an RF portion filter 22.

The RF portion filter 22 removes radio frequency components from a signal inputted from the down converter 20. Because the purpose of this filtering is to enable the sampling to be performed correctly in a sampling portion 36, frequency components larger than half the sampling frequency are removed. Because the positioning signals transmitted from the GPS satellites have bandwidths of about 2 MHz, the RF portion filter 22 is configured to have the bandwidth of about 4 MHz, for example.

An A/D converter 28 as one example of an A/D conversion portion digitalizes an analog signal that has passed through the RF portion filter 22 to enable digital processing in the BB portion 18.

The sampling portion 36 samples the signal turned to the digital form in the A/D converter 28. The sampling frequency is set to at least twice the bandwidth of an input signal, and more preferably, it is set to a higher frequency, for example, 2.5 times the bandwidth of the input signal.

The sampling portion 36 outputs the sampling result to a digital filter 38. The signal at this stage, however, contains many noises besides the positioning signals.

The digital filter 38 as one example of a filter portion removes as many signals as possible from the input signal except for the GPS signals by subjecting the digital signal inputted from the sampling portion 36 to numerical processing.

Figure 3:
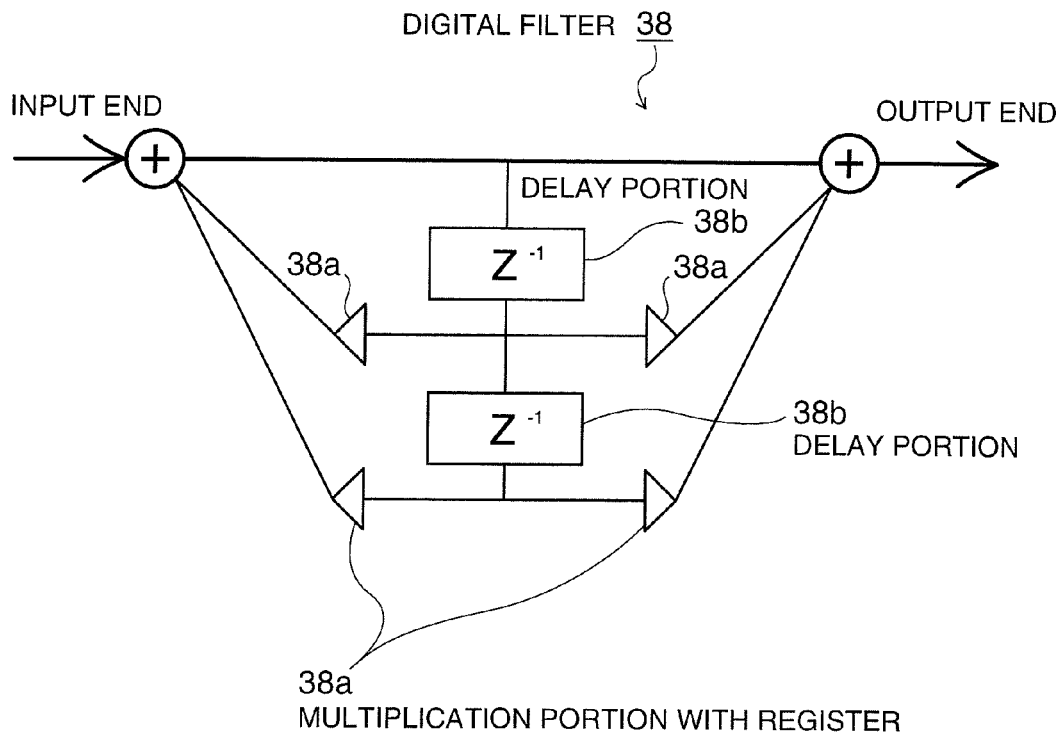
FIG. 3 is a conceptual view showing the configuration of a digital filter.

FIG. 3 is a conceptual view showing the basic configuration of the digital filter 38. The digital filter 38 has multiplication portions 38a with register and delay portions 38b. It is therefore possible to change the characteristic of the digital filter 38, such as the frequency characteristic and the output level, by varying numerical values set in the registers of the multiplication portions 38a with register. Also, the digital filter 38 of FIG. 3 is the basic form, and a more complex characteristic may be achieved by connecting these filters in series in several stages or the characteristics may be switched for a satellite from which the signal is received by disposing these filters in parallel.

A PN code synchronization portion 40 as one example of a code synchronization establishment portion establishes the synchronization between the PN code contained in the signal extracted from the digital filter 38 and the PN code generated locally in the GPS receiver 10. The phrase "the synchronization is established" means a state where the phase of the PN code at the transmitter end and the phase of the PN code generated inside the GPS receiver 10 coincide with each other, and a signal transmitted from a particular GPS satellite can be extracted from the reception signal. A state where the synchronization is established may be also expressed as "acquisition of the satellite succeeds".

Even after the synchronization is established, there may be a case where the synchronization is lost due to fluctuations in the signal reception situations. A state where the synchronization is maintained over a certain time is therefore expressed as "synchronization is stabilized".

A computation portion 42 obtains a navigation message by decoding the reception signal separated for each GPS satellite. The computation portion 42 next calculates the current position of the GPS receiver 10 according to the navigation message thus obtained. An output portion 44 outputs the current position thus calculated to a display device comprising, for example, a liquid crystal display, in the form of an image.

A control portion 30 comprises, for example, a micro processor, and controls operations of the entire GPS receiver 10. It performs controls using control signals sent to the respective components forming the GPS receiver 10, such as the RF portion 16, by running the OS (Operating System) and application programs pre-installed in a storage portion 32.

The storage portion 32 as one example of a storage device comprises, for example, a RAM (Random Access Memory), and it stores programs run by the control portion 30, such as a filter characteristic change program 34, as well as the navigation data obtained in the computation portion 34, the current position of the GPS receiver 10 calculated by the computation portion 34, etc.

The storage portion 32 is not limited to a RAM, and it can be any type of memory capable of storing information for the control portion 30 to read out, such as a ROM (Read Only Memory) and a flash memory.

The filter characteristic change program 34 as one example of a filter characteristic change portion is a program that sets the characteristic of the digital filter 38 by changing the numerical values set in the multiplication portions 38a with register in the digital filter 38 (see FIG. 3). An example of the operation of this program will now be described.

Figure 4:
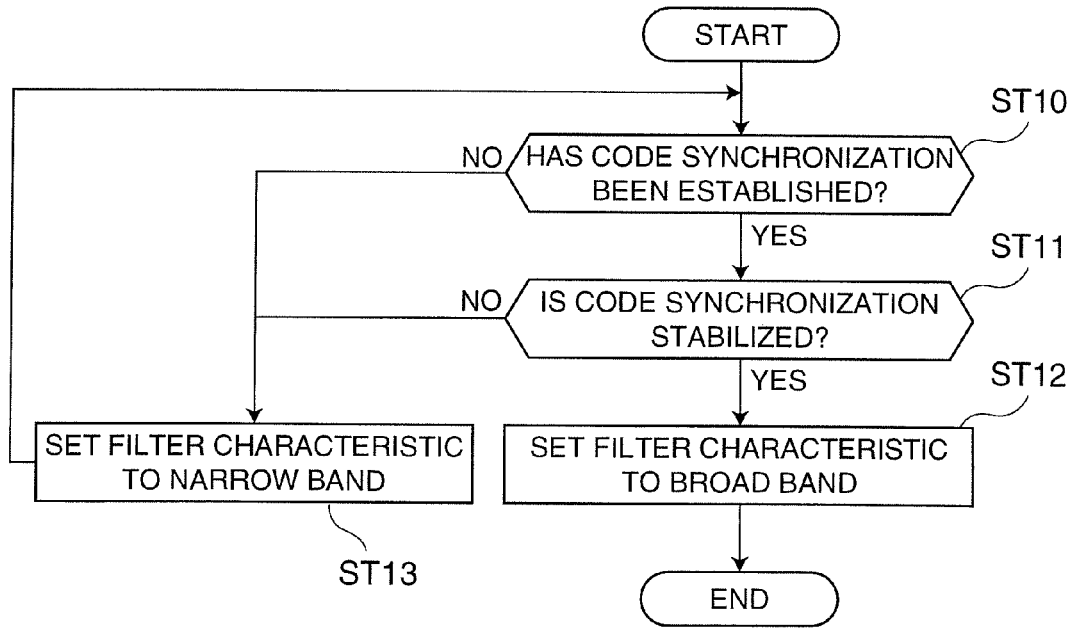
FIG. 4 is a flowchart detailing an example of the operation of a filter characteristic change program.

FIG. 4 is a flowchart detailing an example of the operation of the filter characteristic change program 34 when the filter characteristic is changed in response to the operating state of the GPS receiver 10.

According to the filter characteristic change program 34, whether the synchronization of the PN codes has been established is judged first (ST10). This judgment is made, for example, by referring to the flag periodically. When the synchronization of the PN codes has not been established, the characteristic of the digital filter 38 is set to a narrow band (judgment result in ST10 is NO, ST13).

When the synchronization of the PN codes has been established, whether the synchronization is stabilized is judged (ST11). This judgment is made, for example, as follows. That is, in a case where the synchronization has been established over a period longer than a pre-set threshold, the synchronization is judged as having been stabilized.

When the synchronization has not been stabilized, the characteristic of the digital filter 38 is set to a narrow band judgment result in ST11 is NO, ST13). The purpose to set the characteristic of the digital filter 38 to a narrow band until the code synchronization is stabilized in this manner is to enhance the sensitivity of the GPS receiver 10 by reducing noise components contained in the signal.

When the synchronization of the PN codes has been established and is now stabilized, the characteristic of the digital filter 38 is set to a broad band (judgment result in ST11 is YES, ST12). This is to enhance the positioning accuracy by flattening the phase characteristic over wide frequencies of the reception signal.

Due to the operation of the filter characteristic change program 34 as described above, the GPS receiver 10 changes the characteristic of the digital filter 38 before and after the synchronization of the PN codes is stabilized, and is thus able to achieve both fast code synchronization (acquisition of satellite) and highly accurate positioning.

Figure 5:
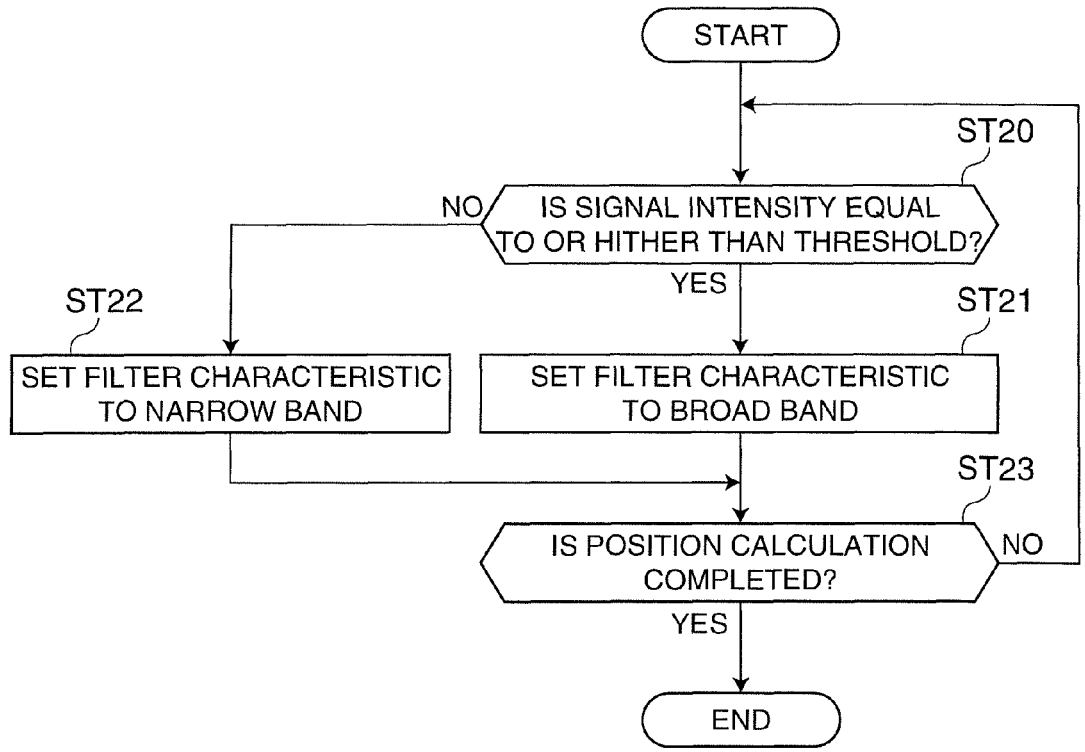
FIG. 5 is a flowchart detailing another example of the operation of the filter characteristic change program.

FIG. 5 is a flowchart detailing an example of the operation of the filter characteristic change program 34 when the filter characteristic is changed in response to the intensity of the reception signal.

Initially, whether the intensity of the reception signal is equal to or higher than a certain threshold is judged (ST20). This judgment is made by allowing the filter characteristic change program 34 to directly obtain the intensity of the reception signal. Also, in a case where the GPS receiver 10 has more than one positioning mode, for example, an outdoor mode and an indoor mode, and the operation modes are switched in response to the intensity of the reception signal, the judgment on the intensity of the reception signal may be made indirectly by allowing the filter characteristic change program 34 to obtain the positioning mode that is currently used.

When the intensity of the reception signal is higher than the pre-set threshold, it is assumed that the external environment of the GPS receiver 10 is satisfactory. The characteristic of the digital filter 38 is therefore set to a broad band to enhance the positioning accuracy (judgment result in ST20 is YES, ST21). When the intensity of the reception signal is lower than the threshold, it is assumed that the external environment of the GPS receiver 10 is poor. The characteristic of the digital filter 38 is therefore set to a narrow band to enhance the sensitivity (judgment result in ST20 is NO, ST22). The operation as above is repeated until the calculation of the position is completed (ST23).

Example of Major Operation of GPS Receiver 10

The GPS receiver 10 of this embodiment is configured as described above, and an example of the operation will be described in the following.

Figure 6:
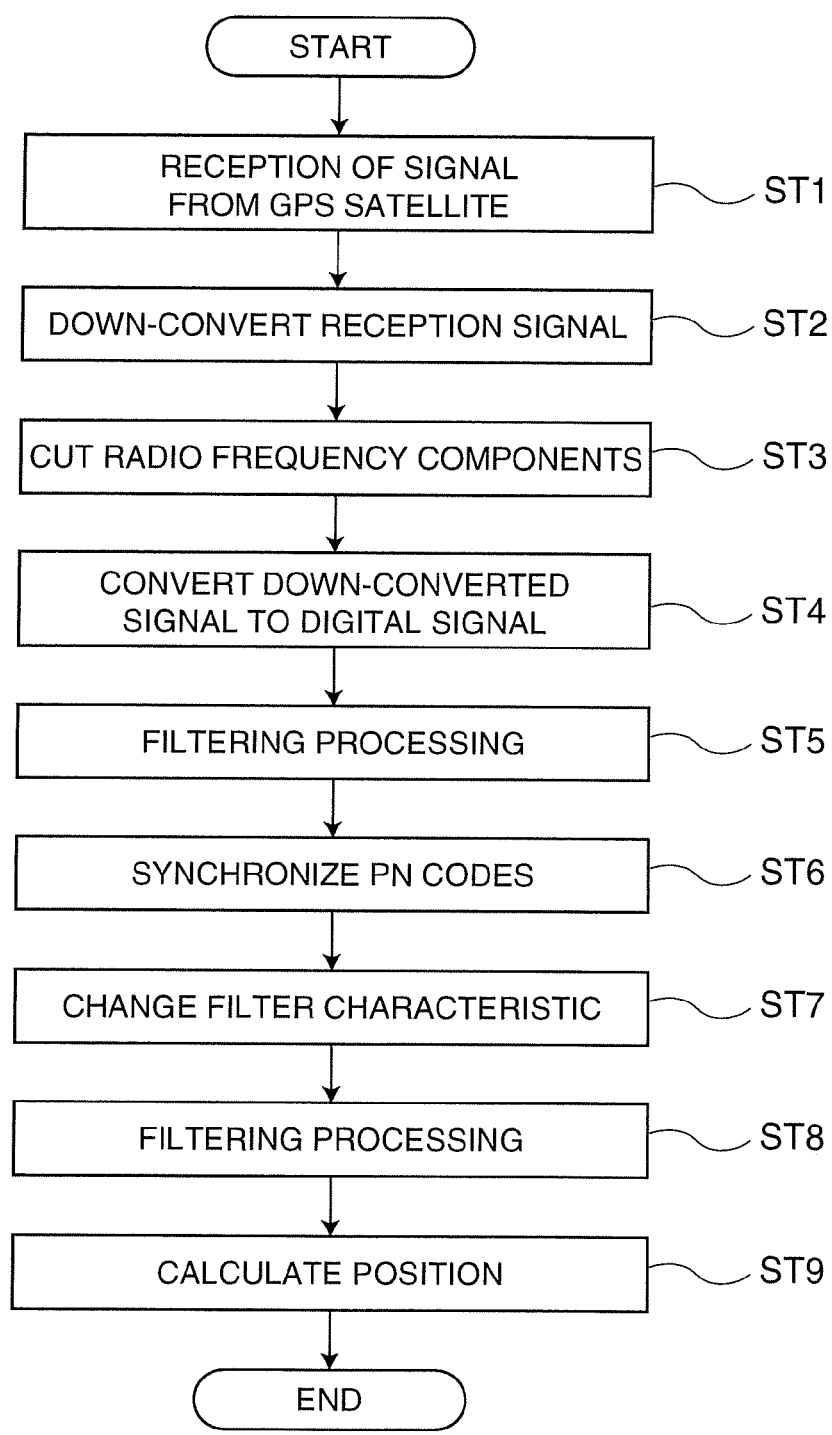
FIG. 6 is a flowchart detailing an example of the operation of the GPS receiver of FIG. 1.

FIG. 6 is a flowchart schematically showing an example of the major operation of the GPS receiver 10 of this embodiment.

A reception signal is obtained by receiving the positioning signals S1 and so forth transmitted from the GPS satellites 12a and so forth at the GPS antenna 14 (ST1, an example of receiving the signal). The reception signal is a radio frequency analog signal at the frequency of 1.575 GHz.

The reception signal is sent to the down converter 20, and is down-converted to a frequency of the order of several hundred KHz, for example (ST2).

The down-converted reception signal is then sent to the RF portion filter 22, and frequency components larger than half the sampling frequency are cut so as not to cause a trouble in the subsequent sampling step (ST3).

The reception signal is then digitalized and sampled by the A/D converter 28 and the sampling portion 36, respectively (ST4, an example of subjecting the reception signal to the A/D conversion).

Subsequently, filtering by the digital filter 38 is preformed to remove noises from the reception signal (ST5, an example of filtering the digital signal). Because the synchronization of the PN codes has not been established at this stage, the characteristic of the digital filter 38 is set to a narrow band to enhance the sensitivity.

Because transmission signals from more than one GPS satellite are mixed in the digital signal obtained in the steps from ST1 through ST5, the digital signal is sent to the PN code synchronization portion 40 for the synchronization of the PN codes (ST6, an example of establishing the code synchronization). When the code synchronization is established, a signal from a particular GPS satellite can be isolated. The signal at this stage, however, still contains noises.

After the synchronization of the PN codes is established, the characteristic of the digital filter 38 is changed to a broad band to enhance the positioning accuracy (ST7, an example of changing the filter characteristic). This change can be made by allowing the control portion 30 to run the filter characteristic change program 34 pre-installed in the storage portion 32.

Filtering is performed again after the filter characteristic is changed to remove noises from the reception signal (ST8).

The navigation data can be thus acquired from the reception signal that now contains the transmission signal from a single GPS satellite alone. The current position of the GPS receiver 10 is then calculated using the navigation data thus acquired (ST9).

As has been described, the GPS receiver 10 is able to set the characteristic of the digital filter 38 appropriately in response to the external environment of the GPS receiver 10 and the operating state of the GPS receiver 10 by running the filter characteristic change program 34. Also, because the filter characteristic can be set by changing the numerical values stored in the registers of the digital filter 38 by running the filter characteristic change program 34, it can be set at quite a high speed.

The GPS receiver 10 is therefore able to perform highly accurate positioning in a short time.

Second Embodiment

Figure 7:
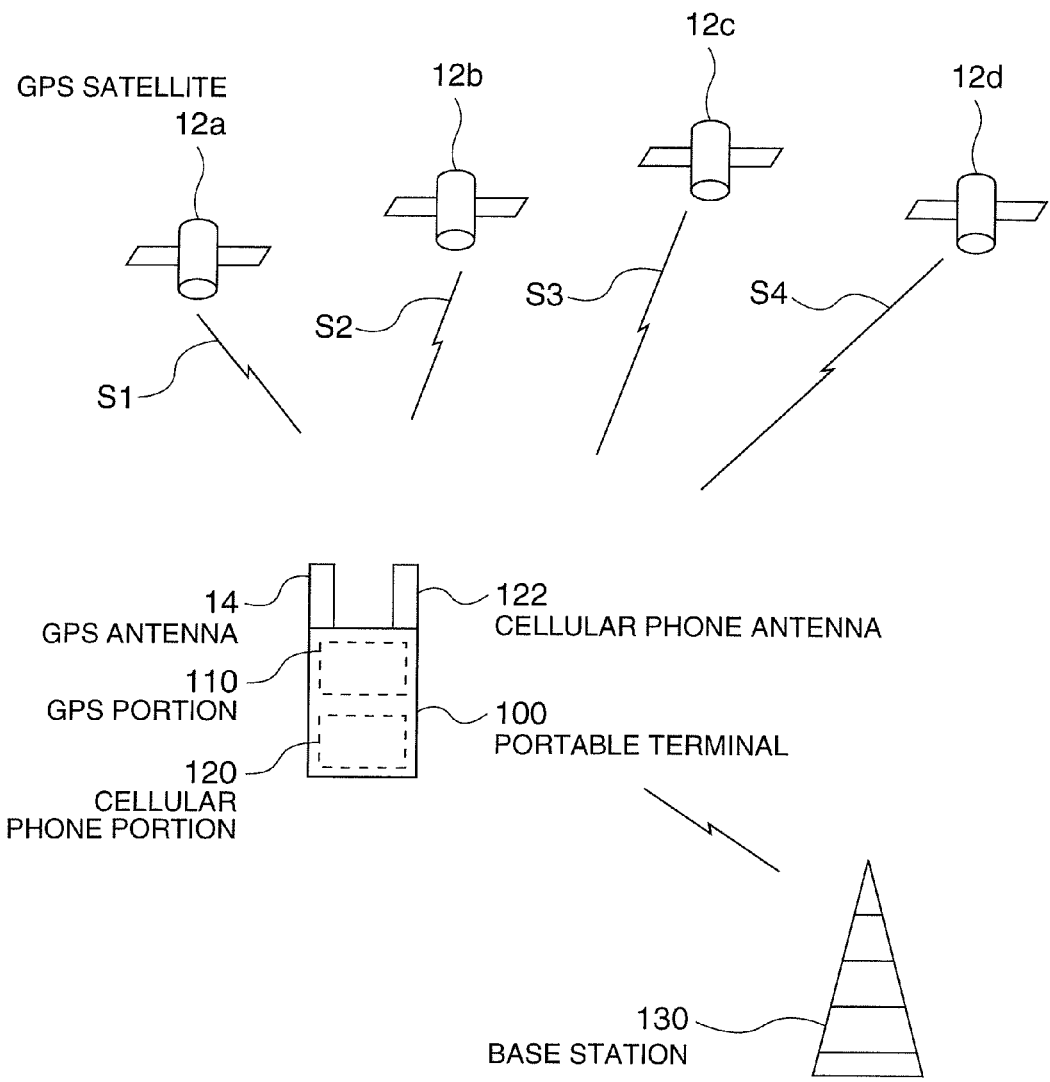
FIG. 7 is a view schematically showing a portable terminal and the like according to another embodiment of the invention.

FIG. 7 is a view schematically showing a portable terminal 100 and the like according to another embodiment of the invention.

The portable terminal 100 as one example of the positioning signal reception device has a GPS antenna 14 and a GPS portion 110, and is able to perform the positioning by receiving positioning signals S1 through S4 transmitted from GPS satellites 12a through 12d, respectively.

The portable terminal 100 also has a cellular phone portion 120, and thereby enables communications with another cellular phone terminal or the like by establishing a connection to a base station 130 by transmitting/receiving radio waves at a cellar phone antenna 122. Because the signal intensity of the radio wave transmitted/received to/from the cellular phone portion 120 is far stronger than the signal intensity of the positioning signals S1 and so forth from the GPS satellites 12a and so forth received at the GPS reception portion 110, the radio wave transmitted from the cellular phone portion 120 may possibly become a disturbing signal to the GPS reception portion 110.

Configuration of Portable Terminal 100

Figure 8:
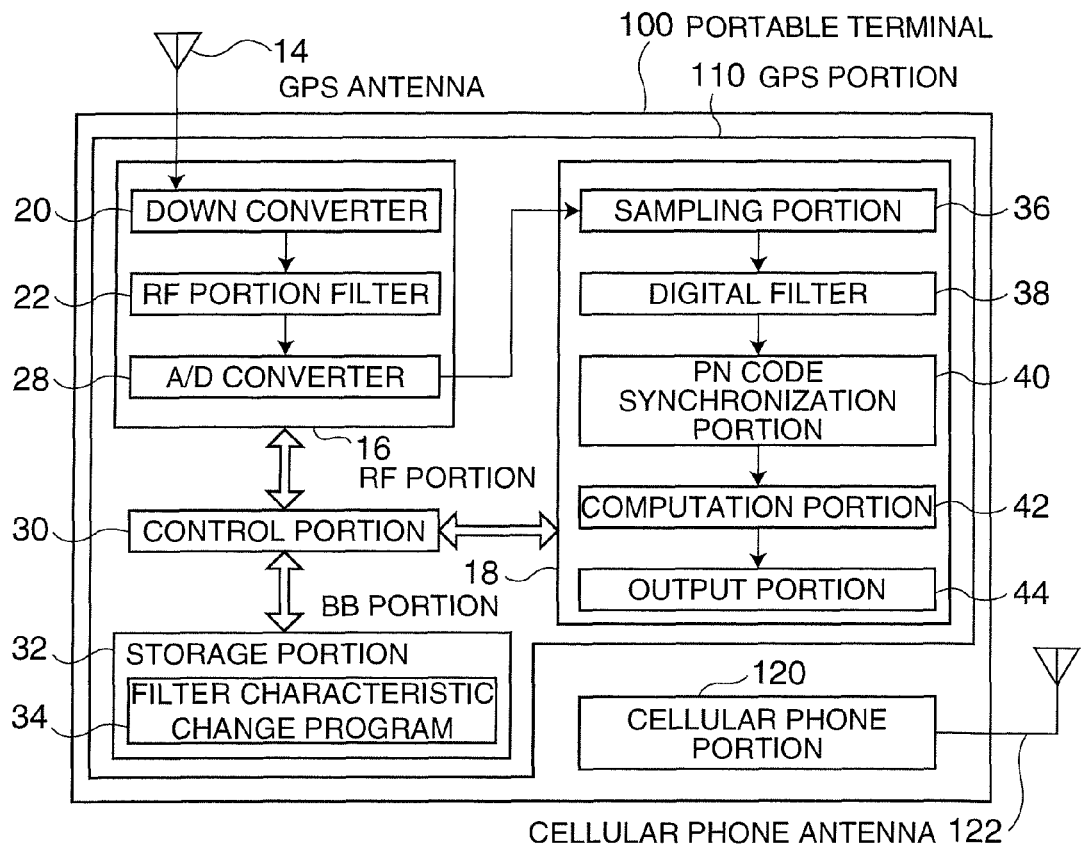
FIG. 8 is a view schematically showing the major configuration of the portable terminal of FIG. 7.

FIG. 8 is a view schematically showing the configuration of the portable terminal 100. Referring to the drawing, a solid line arrow indicates the flow of the processing on the reception signal, and a thick outline arrow indicates the flow of the control. The configurations of the GPS antenna 14 and the GPS portion 110 are the same as their counterparts in the GPS receiver 10 of FIG. 2; however, the filter characteristic change program 34 operates in a different manner.

Figure 9:
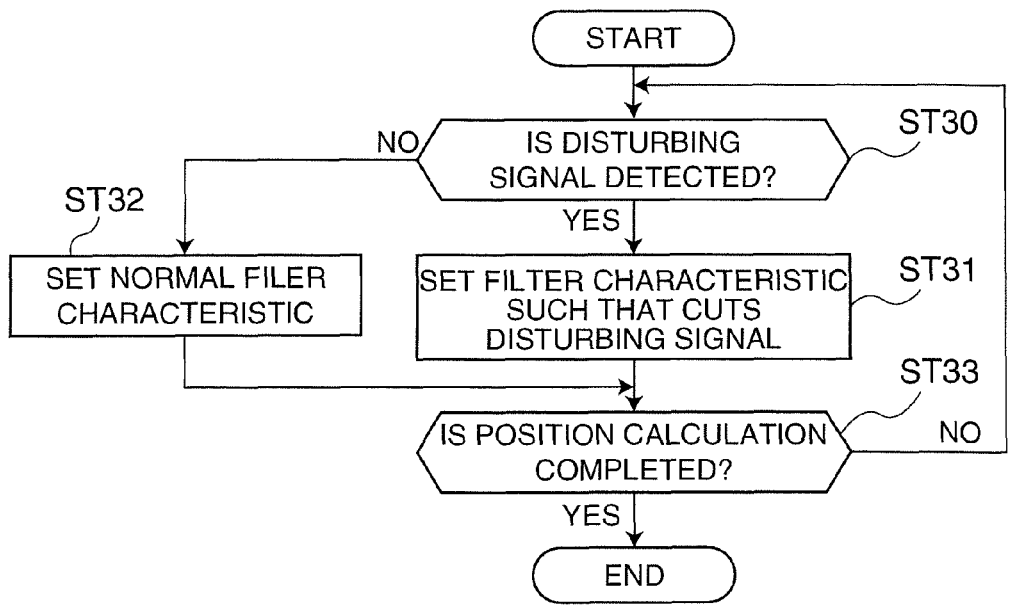
FIG. 9 is a flowchart detailing an example of the operation of the filter characteristic change program.

FIG. 9 is a flowchart detailing an example of the operation of the filter characteristic change program 34 when the filter characteristic is changed in response to the absence or presence of a disturbing signal as one example of the external environmental condition.

Initially, whether a disturbing signal is contained in the reception signal is judged (ST30).

When the disturbing signal is detected, the filter characteristic change program 34 changes the characteristic of the digital filter 38 by changing the numerical values stored in the multiplication portions 38a with register in a direction to cut the detected disturbing signal (judgment result in ST30 is YES, ST31).

When no disturbing signal is detected, the characteristic of the digital filter 38 is set to the normal characteristic by changing the numerical values of the multiplication portions 38a with register (judgment result in ST30 is NO, ST32).

The filter characteristic change program 34 is kept run until the GPS portion 110 ends the positioning (ST33).

Because the portable terminal 100 has the cellular phone portion 120, it is anticipated that a signal transmitted from the cellular phone portion 120 is received at the GPS antenna 14, and this signal becomes a disturbing signal to the GPS portion 110.

When the occurrence and the frequency of the disturbing signal are known, by setting the digital filter to the characteristic such that selectively attenuates the frequency of the disturbing signal, it is possible to reduce the influences of the disturbing signal without impairing the reception performance of the GPS.

Figure 10:
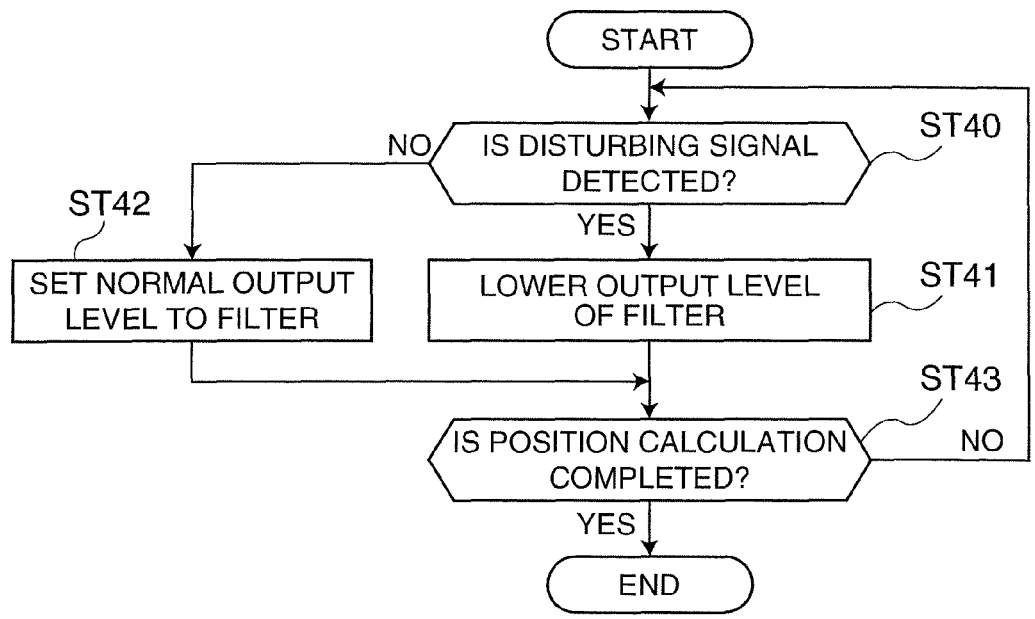
FIG. 10 is a flowchart detailing another example of the operation of the filter characteristic change program.

FIG. 10 is a flowchart detailing another example of the operation of the filter characteristic change program 34 when the filter characteristic is changed in response to the absence or presence of a disturbing signal as one example of the external environmental condition.

Initially, whether a disturbing signal is contained in the reception signal is judged (ST40).

When the disturbing signal is detected, the filter characteristic change program 34 changes the characteristic of the digital filter 38 by changing the numerical values stored in the multiplication portions 38*a* with register in a direction to lower the level of an output signal from the digital filter 38 (judgment result in ST40 is YES, ST41).

When no disturbing signal is detected, the characteristic of the digital filter 38 is set to the normal characteristic by changing the numerical values in the multiplication portions 38*a* with register (judgment result in ST40 is NO, ST42).

The filter characteristic change program 34 is kept run until the GPS portion 110 ends the positioning (ST43).

The output level of a signal outputted from the filter is lowered in the presence of the disturbing signal also in the related art. However, because a level adjustment circuit operating at a frequency of the order of several tens Hz is formed using an analog circuit, it is impossible to follow an abrupt change in environment, such as interference caused by switching noises or a burst transmission of a cellular phone.

The portable terminal 100 of the invention, however, adjusts the output level using the digital filter 38, which is a digital circuit and is thereby able to operate at a high speed. It is thus possible to maintain the characteristic of the digital filter 38 to be optimal by following an abrupt change in environment.

As has been described, according to the portable terminal 100, the filter characteristic change program 34 detects the occurrence of the disturbing signal, which allows the frequency characteristic or the output level of the digital filter 38 to be set appropriately.

It is thus possible to perform highly accurate positioning in a short time even in the environment under which a disturbing signal occurs.

It should be appreciated that the invention is not limited to the embodiments above. Further, the respective embodiments above may be combined with each other.

What is claimed is:

1. A receiver that receives a positional signal from a positioning satellite to execute a positioning calculation, the receiver comprising:
   a filter that filters the positional signal, the filter having a filter bandwidth within a certain bandwidth, wherein a phase characteristic and a frequency characteristic of the filter is changeable; and
   a filter configurer that configures the filter to make the filter bandwidth broader by flattening the phase characteristic over wide frequencies of the positional signal when the positioning satellite is synchronized beyond a predetermined period of time than when the positioning signal is not readily received by the receiver.

2. The receiver according to claim 1, wherein
   whether or not the positioning satellite has been acquired is determined based on synchronization between a pseudorandom noise code extracted from the positional signal and a replica code generated in the receiver.

3. The receiver according to claim 1, wherein
   the filter configurer broadens the filter bandwidth so as to improve accuracy in the positioning calculation.

4. The receiver according to claim 1, wherein
   the filter configurer configures the filter within the certain bandwidth until the positioning satellite is acquired so as to reduce noise from the positional signal.

5. The receiver according to claim 4, wherein
   the noise to be removed includes switching noise, burst noise, or a radio wave transmitted to or from an apparatus in which the receiver is installed.

6. The receiver according to claim 5, wherein
   the apparatus in which the receiver is installed is a cellular phone.

7. A method to control a receiver that receives a positional signal from a positioning satellite to execute a positioning calculation, the method comprising:
   filtering the positional signal through a filter having a filter bandwidth within a certain bandwidth, wherein a phase characteristic and a frequency characteristic of the filter is changeable;
   making the filter bandwidth broader by flattening the phase characteristic over wide frequencies of the positional signal when the positioning satellite is synchronized beyond a predetermined period of time than the positioning signal is not readily received by the receiver; and
   filtering the positional signal through the broadened filter bandwidth.

8. The method according to claim 7, wherein
   the filtering the positional signal through the filter with the certain bandwidth reduces noise from the positional signal.

9. The method according to claim 7, wherein
   the filtering the positional signal through the broadened filter bandwidth improves accuracy in the positioning calculation.

10. The method according to claim 8, wherein
    the noise to be reduced includes switching noise, burst noise, or a radio wave transmitted to or from an apparatus in which the receiver is installed.

11. The method according to claim 10, wherein
    the apparatus in which the receiver is installed is a cellular phone.

* * * * *